US007490104B2

(12) United States Patent
Li et al.

(10) Patent No.: US 7,490,104 B2
(45) Date of Patent: Feb. 10, 2009

(54) METHODS AND SYSTEMS FOR PROVIDING RANDOM ACCESS TO STRUCTURED MEDIA CONTENT

(75) Inventors: Jin Li, Beijing (CN); Hong-Hui Sun, Beijing (CN); Hu Li, Beijing (CN); Qian Zhang, Beijing (CN); Xianoning Ling, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 10/843,544

(22) Filed: May 10, 2004

(65) Prior Publication Data

US 2004/0210604 A1    Oct. 21, 2004

Related U.S. Application Data

(62) Division of application No. 09/453,827, filed on Dec. 1, 1999, now Pat. No. 6,807,550.

(51) Int. Cl.
*G06F 17/00* (2006.01)
(52) U.S. Cl. .................. 707/104.1; 707/101; 707/102; 707/103 R
(58) Field of Classification Search ............... 707/1–10, 707/100–104.1, 200–206
See application file for complete search history.

(56) References Cited

U.S. PATENT DOCUMENTS

| 5,463,776 | A | | 10/1995 | Voigt et al. |
| 5,721,916 | A | * | 2/1998 | Pardikar ..................... 707/201 |
| 5,826,031 | A | * | 10/1998 | Nielsen ............... 707/E17.118 |
| 5,864,682 | A | | 1/1999 | Porter et al. |
| 6,314,408 | B1 | | 11/2001 | Salas et al. |
| 6,385,596 | B1 | | 5/2002 | Wiser et al. |
| 6,385,642 | B1 | | 5/2002 | Chlan et al. |
| 6,401,239 | B1 | | 6/2002 | Miron |
| 6,473,902 | B1 | * | 10/2002 | Noritomi ..................... 709/200 |

* cited by examiner

*Primary Examiner*—Isaac M Woo
(74) *Attorney, Agent, or Firm*—Lee & Hayes, PLLC

(57) ABSTRACT

Methods and systems for providing random access of structured media content are described. One aspect provides a novel file structure or "Vfile", and method of using the same, for organizing and managing portions of a structured media content file that are or can be downloaded from a content provider such as a multimedia content server. The Vfile is configured to emulate a server file structure that a server uses to store structured media content files. The Vfile is established at a client location when a client accesses a structured media content file and is used to buffer and cache structured media content file portions. In addition, the Vfile includes one or more media management tags. The tags are used by the client to manage a cache of structured media content file portions that are downloaded from the server.

20 Claims, 9 Drawing Sheets

METHODS AND SYSTEMS FOR PROVIDING RANDOM ACCESS TO STRUCTURED MEDIA CONTENT

RELATED APPLICATIONS

This is a divisional of U.S. patent application Ser. No. 09/453,827, filed Dec. 1, 1999 now U.S. Pat. No. 6,807,550.

TECHNICAL FIELD

This invention relates to methods and systems for providing random access to structured media content, such as multimedia content, over a network environment such as the Internet.

BACKGROUND

As the Internet continues to grow in popularity, more and more media content is being placed "on-line" and is accessible via the Internet. Examples of such media include voice, music, image, video, and 3-dimensional scenery. This media is typically stored on one or more servers. A user typically accesses the media at the server by using a client computer that has a suitably programmed browser. The user's browser can communicate a user's request, by virtue of a number of different protocols, to the server to request a particular type of media. When the server receives a request from a user's browser, it executes the request by retrieving the requested media and transmitting it in a suitable format to the user's computer. The user's browser can then take the steps necessary (such as launching an associated player application) so that the user can experience (i.e. view or listen to) the requested media.

In the past, downloading media via a network, such as the Internet, has been a time-consuming task. This, in addition to transmission bottlenecks that can occur, has led to poor user browsing experiences. In the more recent past, developments have been made to attempt to enhance the user's browsing experience. One such attempt concerns the use of so-called "streaming multimedia". In streaming multimedia, media content is streamed over the Internet and simultaneously played. For example, an initial portion of the desired media is compressed and downloaded through the Internet and buffered locally on the client's machine. Subsequently, when the local buffer is full, the client's machine launches a player that decompresses and simultaneously plays the media that has been buffered while continuing to download remaining portions of the compressed media from the Internet. The streaming mechanism works well for "linear" media content such as voice, music and videos. It does not work well for media content for which random access is desired.

In many instances it is desirable to enable a user to navigate through a particular media content. This gives the user an opportunity to view or experience only those portions of the media content that are of particular interest to the user. For example, a user may desire to view only one particular portion of a downloaded image. Alternately, the user may desire to view several selected portions of an image, but not all of the portions of the image.

To meet the needs for randomly accessing media content, several different forms of media content have emerged. These forms include JPEG 2000 and compressed 3D image based rendering (IBR) scenes (such as concentric mosaic, Lumigraph/Lightfield), to name just a few.

As an example, consider what happens when a user browses a large JPEG 2000 compressed image via the Internet. The basic unit of a JPEG 2000 compressed image is a block bit stream having a certain resolution, space location, and quality level. The basic unit also includes an abstract layer that indexes where each basic unit of the JPEG 2000 compressed image is located. When such an image is browsed through a network, the user (i.e. user's software) may specify a particular region of interest, as well as the browsing resolution and the quality of the desired image region to a server. The server then sends only the bit stream that corresponds to the particular image region that is specified by the user.

As another example, consider what happens when browsing a compressed IBR scene, such as a 3-D walkthrough scene compressed by concentric mosaic or Lumigraph/Lightfield techniques. In this example, hundreds of photographs of a particular scene are taken from a number of different views and angles. The photos are digitized, compressed, and stored at a server location. When a user desires to browse a particular scene, the user's browsing software gives parameters of the desired view such as the rendered position, camera viewing angle, and the field of view (FOV) i.e. the resolution. The scene can then be rendered through access rays in selected photographs. The server receives the parameters and finds a corresponding ray that pertains to the images that are digitized and stored by the server. The server then streams only the compressed image data pertaining to the desired view over the network for decoding and display on the client machine.

In each of the above examples, as in the case of other media content examples of which are mentioned above, the amount of media data that is streamed or sent over the network can be quite large and can easily reach tens or hundreds of mega bytes. Constraints in limited bandwidth capabilities of the transmission medium, as well as available client memory used to store such image data continue to present challenges to providing a desirable user experience. Current efforts at designing applications for viewing such image data haven fallen short of the goal of providing a desirable user experience. One such attempt provides an application known as a "load-all-then-render" viewer, such as a baseline JPEG viewer. This type of viewer is very "unintelligent" in that it simply waits for all of the pertinent media data to be collected before performing a rendering operation. Typically, moving between scenes or within a particular scene results in a noticeably stuttered effect or multiple pauses while the relevant progressive JPEG viewer, use a periodic update feature in which several waypoints for media data collection are set. When a particular waypoint is reached, the viewer renders the image data for the user. This approach has also been sub-optimal generally for the same reasons as were mentioned for the baseline JPEG viewer.

Accordingly, this invention arose out of concerns associated with providing improved methods and systems for randomly accessing structured media content files.

SUMMARY

Methods and systems for providing random access of structured media content are described.

One aspect of the inventive methods and systems provides a novel file structure or "Vfile", and methods of using the same, for organizing and managing portions of a structured media content file that are or can be downloaded from a content provider such as a multimedia content server. The Vfile is configured to emulate a server file structure that a server uses to store structured media content files. The Vfile is established at a client location when a client accesses a structured media content file and is used to buffer and cache structured media content file portions.

In addition to having an infrastructure that emulates the server's file structure, the Vfile includes one or more media management tags. The tags are used by the client to manage a cache of structured media content file portions that are downloaded from the server. In the described embodiment, exemplary tags include (1) a validity tag that indicates whether a particular portion of a structured media content file is available in local cache, (2) a hit count tag that gives an indication of how many times a particular portion has been accessed, (3) an importance tag that gives a weight to the hit count and determines how long the portion can stay in cache, and (4) a lock tag that indicates whether or not to lock selected structured media content file portions in the Vfile.

A client computer or browser utilizes the Vfile to assess the content that is contained (or not contained) in the Vfile. The tags help the cache management decisions concerning particular portions of a structured media content file. For example, the validity tag can be used to ascertain that a particular file portion that is needed to render a current view is not cached in the Vfile. Accordingly, the needed file portion can then be retrieved from the server. The importance tag can be used to regulate which file portions of the cached structured media content file are removed when memory runs low. Those file portions that are currently in use can be temporarily locked so that they are not inadvertently removed. The hit count tag can be used to ensure that infrequently used file portions are swapped out of the Vfile to make room for other, more important file portions.

Another aspect of the invention provides a novel architecture for managing structured media content and includes one or more of an importance evaluator module, a priority evaluator module, and a preemptive loader module.

The importance evaluator is a software module that assigns importance values to different portions of a structured media content file. The importance values are used to determine whether or not to remove individual portions of the structured media content file from a client cache file to make room for other more important file portions. The priority evaluator is a software module that assigns priority values to different portions of a structured media content file. The priority values are used to determine an order in which the portions are to be provided from a server to a client. The preemptive loader is a software module that preemptively provides or facilitates provision of one or more portions of a structured media content file to a client, without the client specifically requesting so.

One aspect of the invention provides a layered architecture that implements a system for randomly accessing structured media content files over a network, such as the Internet. The layered architecture is implemented on both the client and the server end. On the client end, the layered architecture comprises one or more novel client file structures implemented at the respective clients, and useable thereby for organizing and managing portions of a structured media content file that can be randomly accessed by a client. Each client includes a multi-layered set of application program interfaces (APIs) that assist the client in organizing and managing the client file structure.

In the described embodiment, each client includes a client API, a Vfile API, and a network API. The client API interfaces with a user through, for example, the user's browser. The client API also interfaces with the client file structure and the Vfile API. The client API receives user input and regularly monitors the client file structure to render views according to the content that is available in the client file structure. The Vfile API is an intermediate API that interfaces with the client API, the network API and the client file structure. The Vfile API interfaces with the client API to provide content from the client file structure for rendering for the client. The Vfile API includes functions that provide cache management of the client file structure. The network API interfaces with the Vfile API and includes functions that manage communication with one or more servers. The network API receives requests from the Vfile API and coordinates communication activities to ensure that requested structured media content file portions are retrieved from the server and cached in the client file structure. In the described embodiment, the server comprises a network API that communicates with the client-side network API for retrieving particular structured media content file portions and providing or streaming them to the client.

DETAILED DESCRIPTION

Exemplary Computer System

Figure 1:
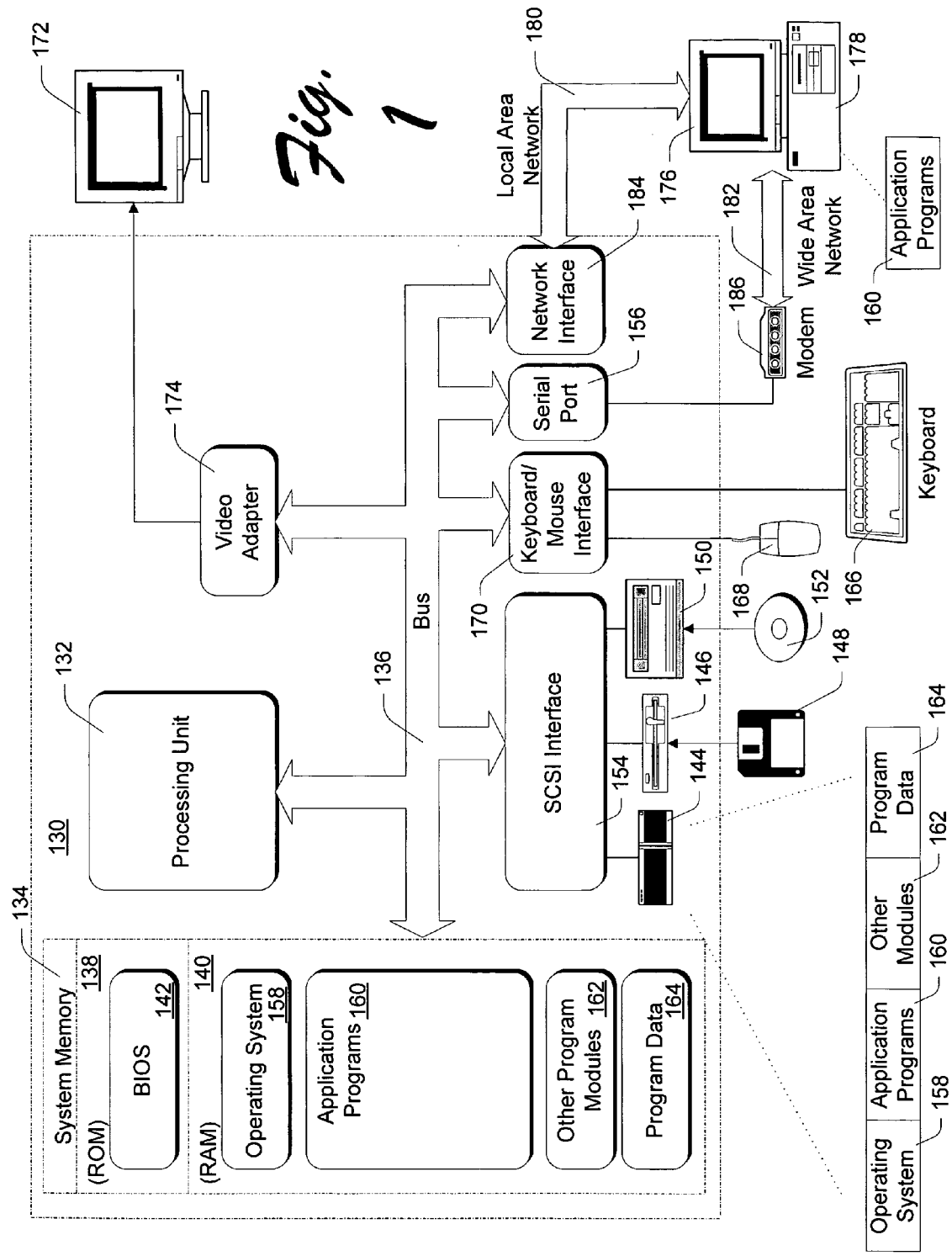
FIG. 1 is a diagram of an exemplary computer system that can be used to implement one of more of a client or server computer in accordance with the described embodiment.

Preliminarily, FIG. 1 shows a general example of a computer 130 that can be used to implement client and server computers in accordance with the described embodiment. Various numbers of computers such as that shown can be used in the context of a distributed computing environment.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS)

142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Overview

Aspects of the invention provide a novel file structure, referred to herein as a "client file structure" or "Vfile" for "virtual file", that serves as a platform for randomly accessing structured media content over a network such as the Internet.

Figure 2:
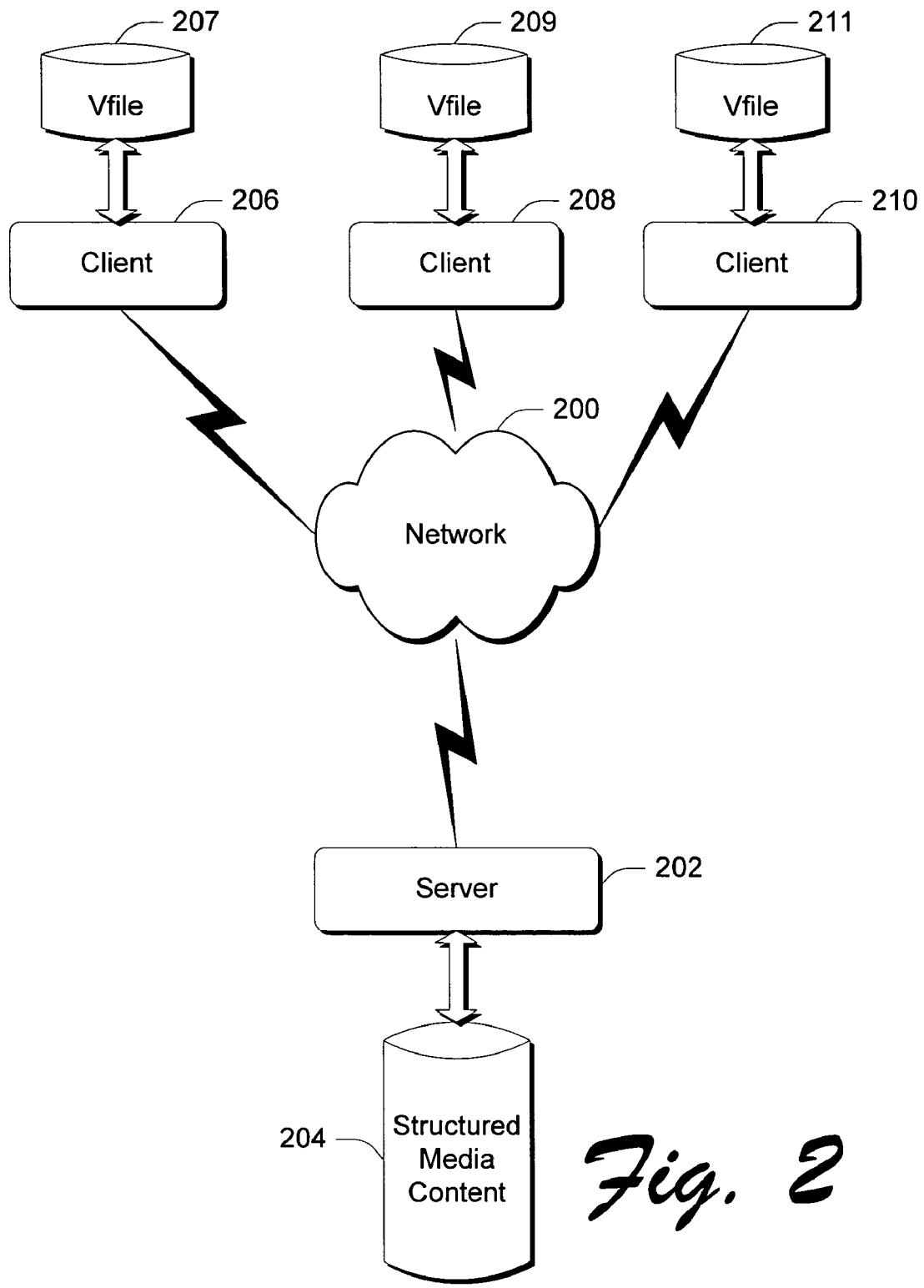
FIG. 2 is a diagram of a network in which aspects of the described embodiment can be employed.

FIG. 2 shows an exemplary network environment in which the inventive Vfile can be used. The environment includes a network 200 over which communication takes place between various clients and servers. In the described embodiment network 200 comprises the Internet. It is to be understood, however, that the inventive aspects described below are not to be limited to application only in the context of the Internet. Accordingly, other networks (e.g. LANs/WANs) can be used. In the illustrated example, a server 202 provides access to media content 204. Server 202 can comprise any suitable server that is capable of providing access to media content in accordance with the described embodiment. Although only one server is shown, it should be apparent that many servers could be and, many times are networked together to provide media content to one or more client. The inventive methods and systems are employed in the context of "structured" media content which is discussed in more detail below in a section entitled "Structured Media Content".

As shown, a number of clients—here clients 206, 208, and 210, are communicatively linked with server 202 via network 200 so that they can access media content 204. In the illustrated example, each of the clients has its own Vfile. Accordingly, client 206 includes Vfile 207, client 208 includes Vfile 209, and client 210 includes Vfile 211. The Vfile helps each client manage random access to structured media content in a manner that can greatly improve the client browsing experience, as will become apparent below.

When a particular portion of a structured media content file is queried over the network by a client, as through suitable software executing on a client computer, a client file structure or Vfile (e.g. Vfiles 207, 209, 211) is created locally on the client's computer. The Vfile corresponds to and, in the described embodiment, emulates the media file that the server uses to store the queried structured media content file. The Vfile serves a couple of purposes—first, it buffers the media content that is downloaded from the server—second, it caches certain media content that satisfies defined or definable cache requirements. Cache requirements can include frequency of use, importance of content portions, resolution of the media content portion, and the like. Caching certain media content locally allows it to be reused quickly in the event that it can be. This saves the client from having to re-query the cached media content from the server.

Because of limitations on the download bandwidth and the local client storage, the Vfile might not contain all of the media content that is located in the corresponding server-side media file. Accordingly, when a portion of the media file that is not located in the Vfile is needed for execution by a client, e.g. to render a view, software executing on the client's computer generates an exception and, simultaneously, sends a request for the media file portion to the server. The server receives the request and streams the desired portion of media file to the client. The client then receives the media file portion from the server, uses it to render a particular view and, in accordance which the inventive cache management techniques, uses the Vfile to store the file portion until it is no longer needed.

The inventive methods and systems provide a media architecture for accessing and streaming structured media over a network such as the Internet. The Vfile supports the random access of portions or segments of a remote file, cache management, prioritized streaming, network packetization, packet loss recovery, error resilience, and the like. The easy and unified programming interface of the Vfile relieves most of the chores of network media streaming, and allows the media programmer to focus on the media application itself.

In an example that follows below, features and functionality of the Vfile are described in the context of a JPEG 2000 bit stream. Though the structured bit stream of JPEG 2000 enables the bit stream to be accessed by region of interest (ROI), resolution and quality, no network tools currently exist to stream and manage such content. The Vfile meets these needs by providing the network functionality that supports random access of a JPEG 2000 bit stream across the network. Using the Vfile in the context of a JPEG 2000 bit stream, the user may browse a very large image over the network with a resolution that far exceeds the current browser window. The users may also select the browsing ROI and resolution on the fly. The entire image may be viewed at a low resolution, or a particular region of the image may be viewed at a high resolution. In the described embodiment, only the bit stream covering the current view is streamed through the network, and the streaming is performed in a prioritized way so that at first a low quality region is shown with very few arriving bits. The quality of the view then gradually improves as more and more of the bit stream is received. Cache management is provided so that not all of the bit stream needs to be streamed over the network. The Vfile greatly improves the experience of browsing large images over a slow network.

The Vfile, a virtual file media access mechanism, provides prioritization, cache capabilities and random access functionality for media accessing over the Internet. The Vfile provides the Internet media programmer with a unified programming interface—a set of application program interfaces (APIs), so that the programmer can disregard such things as the TCP/IP protocol, caching implementation, packet prioritization, etc. Through the Vfile API, a remote media file appears like a local file to the programmer, who can then access the file with interfaces very similar to the familiar file operating routines, such as fopen, fread, etc. The Vfile, however, is a virtual file in the sense that not all portions or segments of the file are available immediately. When the network connection is first established, the entire Vfile is empty. When a portion or segment of the remote media is accessed, Vfile API serves the application on a best effort basis, i.e., it returns to the calling application immediately with whatever data is available. In the interim, the Vfile API generates a network request for those missing portions or segments so that they can be streamed over the network at a later time. When the missing portions or segments arrive, they are stored in a local Vfile cache so that they can be accessed in later function calls. A cache management strategy is provided so that less important and less accessed media segments are swapped out of or removed from the cache. The calling application specifies the priority/importance of the accessed segments, so that the high priority segments can be streamed prior to the low priority ones, and high importance segments will be more likely in cache when the remote file is revisited. In addition, the media (client) application may also preemptively load media segments with a low priority to anticipate the users need.

Structured Media Content

The described embodiment is described in the context of methods and systems that provide or otherwise facilitate random access to "structured media content". Structured media content is a special type of media content that typically has a file format that includes a portion for data (usually compressed data) that represents the media content itself (i.e. the compressed media bit stream), and a portion for data that gives information about the media content (i.e. the media structure). The inventive Vfile architecture can be used in connection with any suitable structured media (e.g. multimedia) content. This includes, but is not limited to, those media content types referenced in the "Background" section above. For exemplary purposes, however, a JPEG 2000 file format is described.

Figure 3:
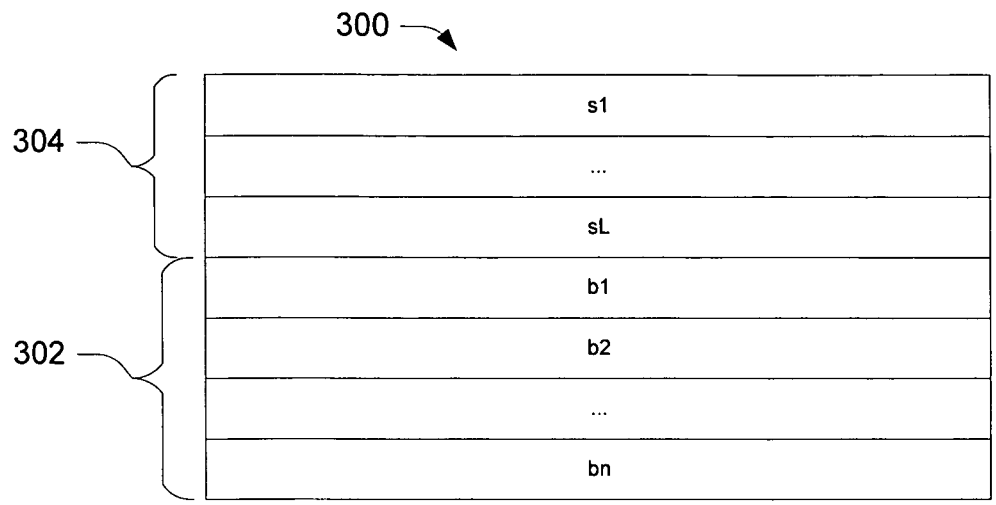
FIG. 3 is a diagram of an exemplary structured media content file.

FIG. 3 shows an exemplary JPEG 2000 file format 300 that includes first and second portions 302, 304 respectively. File portion 302 comprises the elementary compressed media bit stream and file portion 304 comprises the encoded media structure. In the illustrated example, the elementary compressed media bit stream is denoted by individual portions $b_1$, $b_2, \ldots, b_n$ and the encoded media structure is denoted by individual portions $S_1, \ldots S_L$. In the case of a JPEG 2000 file, each individual portion $b_1, b_2, \ldots, b_n$ of file portion 302 is an encoded bit stream of a block of coefficients at a certain resolution, space position and quality level. Each individual portion $s_1, \ldots s_L$ of file portion 304 is a JPEG abstraction layer that includes information such as whether a block exists in the current abstraction layer and, if it exists, the length of its corresponding elementary bit stream in the layer. Additionally, global head information such as the size of the image, the wavelet tile size, the wavelet filter and decomposition scheme, the quantization and entropy scheme used in compressing the image will be stored in the media structure $s_1$.

Exemplary Structured Media Management Data Structure

Aspects of the invention provide a novel Vfile structure for organizing and managing portions of a structured media content file that are or can be downloaded from a content provider such as a multimedia content server. The Vfile is configured to emulate a server file structure that a server uses to store structured media content files. A Vfile is established at a client location when a client accesses a structured media content file and is used to buffer and cache structured media content file portions. In addition to having an infrastructure that emulates the server's file structure, the Vfile includes one or more media management tags that are used by the client to manage a cache of structured media content file portions that are downloaded from the server. In the described embodiment, the Vfile provides a two-level cache structure. A primary Vfile cache resides in memory, and a secondary Vfile cache resides on the local hard disk. The Vfile cache may be dumped as a permanent file on the hard disk, so that next time when the same media is browsed, that portion of the media file has already been downloaded and can be reused.

Figure 4:
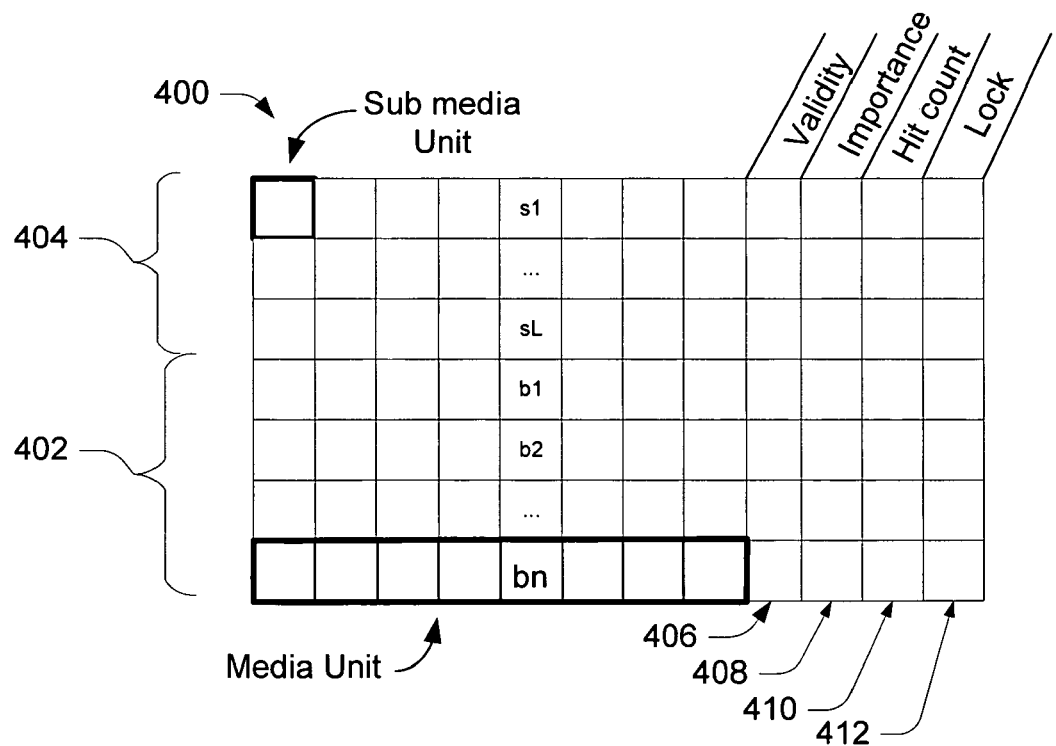
FIG. 4 is a diagram of an exemplary Vfile in accordance with the described embodiment, and one which corresponds to the specifically illustrated file structure of FIG. 3.

FIG. 4 shows an exemplary Vfile 400 that has been created to emulate the file format 300 (FIG. 3) that is used by the server to store and manage a structured media content file.

Accordingly, Vfile 400 includes a first portion 402 and a second portion 404. These portions correspond to respective first and second portions 302, 304 of FIG. 3. Remote media is typically accessed by a media application (client application) by file segment. A file or media segment (MS) is an arbitrary portion of a media file. In the described embodiment, the media file is broken down into smaller portions. In the illustrated example, the Vfile 400 is configured to store a media segment of a larger media file. Each row of Vfile 400 corresponds to a fixed size media unit (MU). Each media unit (MU) is further broken down into smaller portions or sub media units (SMU). A MU will typically consist of 8 SMUs. The MU is the smallest unit for cache management, while the SMU is the smallest unit utilized for media streaming.

Vfile 400 also includes one or more media management tags that assist in managing cached portions of the structured media content file that are downloaded from the server. In the illustrated example, four such tags are shown. Each media unit (i.e. row) of file portions 402, 404 have their own associated tags. In this particular example, the exemplary tags include a validity tag 406 (one maintained for each individual sub media unit (SMU)), an importance tag 408, a hit count tag 410, and a lock tag 412. Use of a fixed size media unit greatly reduces the time for cache hit detection as well as the overhead needed to establish the cache. It is to be understood, however, that the illustrated tags are not intended to limit the invention to only those tag structures that are shown. Accordingly, other tag structures can be utilized in accordance with the described embodiment without departing from the spirit and scope of the invention.

The validity tag 406 indicates whether a particular portion of a structured media content file has been downloaded from the server. In this example, each sub media unit (SMU) has their own validity tag to indicate its download status. Remember, because of limitations in download bandwidth and local client storage, it is likely that not all of a structured media content file is present in the Vfile on the client end. Thus, the validity tag enables the client to determine which portions are present in the Vfile and which portions are not present. If the tag is designated as "valid", then the client knows that the corresponding structured media content file portion is present in the Vfile. If the tag is designated as "invalid", then the client knows that the corresponding structured media content file portion is not present in the Vfile. The validity, as indicated by the validity tags of particular portions of the Vfile, assists the client software in knowing when to generate a request for the server to stream portions of a structured media content file to the client.

The importance tag 408 designates the importance of particular portions of a structured media content file and can be used to determine whether or not to lock selected structured media content file portions in the Vfile. The importance tag also determines the length of stay in the Vfile. By locking portions of the content file that are deemed "important", those particular portions will not have to be again queried from the server—at least while the current view is being rendered. This is because they will not be removed from the Vfile to make room for other file portions. This ensures that the information that corresponds to the locked file portions is at hand and ready for use by the client's software in rendering a particular view. As an example, consider the following: Certain file portions are so important that they should be locked in the Vfile from the very beginning until the media is released. An example is the global media head information that stored in the individual portion $s_1$ of file portion 404. Still, other portions of the Vfile will be accessed with such predictable frequency that they too should be locked. Examples include, the low resolution abstraction layer and bit stream of the JPEG 2000 compressed image. Other Vfile portions having a lower importance should not be stored in the Vfile so that other, more important portions can be stored. These less important portions might include the higher resolution abstraction layer and bit streams. These lesser important portions can, if necessary, be streamed by the server to the client when appropriate. As one exemplary "rule of thumb", structural portions of a structured media content file are always more important than the actual coding bit stream, low resolution coefficients are more important than high resolution coefficients, and coarse quality media units are more important than the refined quality media units. Other "rules of thumb" can, of course, be used.

The hit count tag 410 gives an indication of how many times a particular portion of a structured media content file in the Vfile has been accessed by a client. The hit count tag can also give an indication of when the corresponding file portion was last accessed by the client. Those portions that have not been accessed recently, or have been accessed less than a definable number of times can be removed from the Vfile to make room for other more important or more frequently-accessed file portions.

The lock tag 412 gives an indication of whether or not the media unit (MU) is locked in the Vfile. If the media unit is locked in the Vfile, then it cannot be removed for the duration of its locked status.

Creation of a Structured Media Management Data Structure

Figure 5:
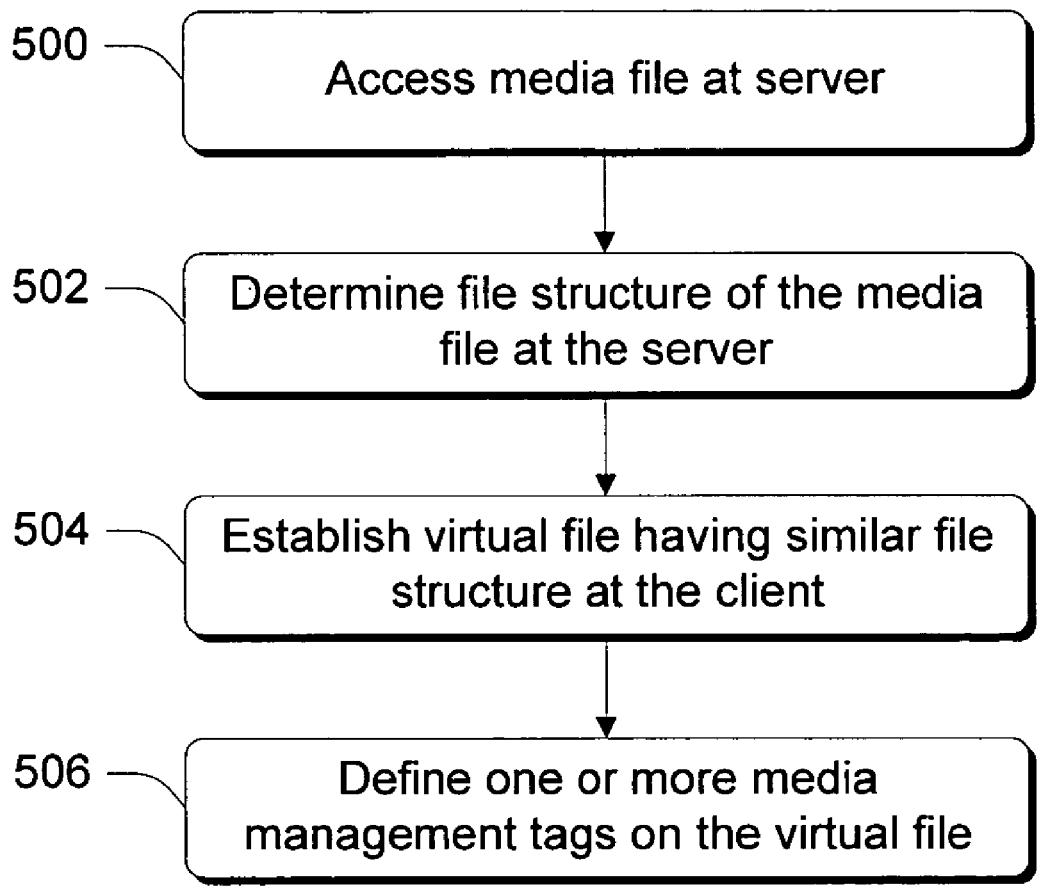
FIG. 5 is a flow diagram that describes steps in a method in accordance with the described embodiment.

One aspect of the inventive methods and systems creates a Vfile structure at one or more client locations. FIG. 5 shows a flow diagram that describes steps in a method for creating a Vfile structure. The steps can be implemented in any suitable hardware, software, firmware or combination thereof.

Step 500 accesses at least a portion of a structured media content file that is maintained in a server file structure that is managed by a server. Access will typically take place through the use of browsing software that is executing on a client machine. Step 502 determines the server file structure that corresponds to the structured media content file that has been accessed. Having determined the server file structure, step 504 establishes a client file structure (i.e. a Vfile) that is configured to emulate the server file structure. An example of a Vfile configured to emulate a server file structure for a JPEG 2000 file is given above. The Vfile can be established through the use of conventional file mapping techniques. Step 506 associates one or more media management tags with the client file structure for use in cache management of portions of the structured media content file. In the above example, the media management tags comprise a validity tag, an importance tag, a hit count tag, and a lock tag. Once the Vfile has been defined on the client end, cache management of the structured media content file portions that are downloaded from the server can now take place.

Cache Management Using Exemplary Media Management Tags and Locked and Unlocked File Portions The inventive methods and systems enable efficient cache management of randomly accessed structured media content file portions. In the described embodiment, a client application executing on the client machine continuously checks the Vfile and performs rendering operations according to the content that is available in the Vfile. The Vfile is continuously updated by removing file portions that are not useful for rendering a current view and locking file portions that are useful in rendering a current view. There are many ways that this concept can be implemented.

Figure 6:
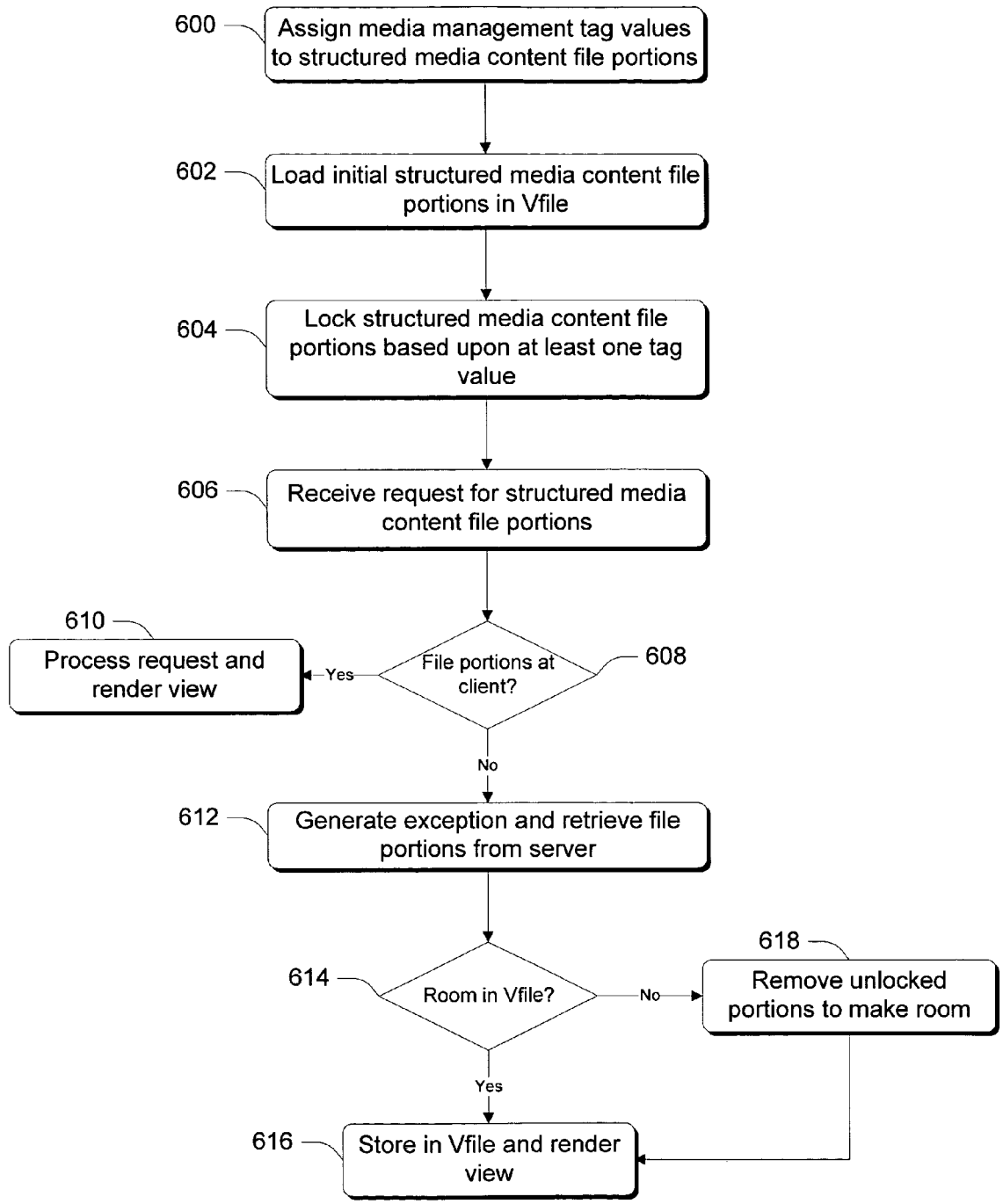
FIG. 6 is a flow diagram that describes steps in a method in accordance with the described embodiment.

FIG. 6 shows a conceptual high level flow diagram of steps in a method of managing a Vfile in accordance with one aspect of the invention. The steps can be implemented in any suitable hardware, software, firmware or combination thereof.

Step 600 assigns media management tag values to the individual structured media content file portions and step 602 loads initial structured media content file portions into the Vfile. It should be understood that assignment of the tag values can take place at the server or the client. In addition, the tag values need not necessarily be assigned prior to storing the corresponding structured media content file portions in the Vfile at the client. As an example, importance values can be pre-assigned at the server or assigned at the client end. Step 604 locks individual portions of the structured media content file in the Vfile. Typically, a file portion is locked in the Vfile if it is "important" or useful for rendering a current view. A number of factors can influence whether a file portion is locked in the Vfile among which include the importance value of the file portion as indicated by the importance tag. Step 606 receives a request for a portion of a structured media content file so that the portion can be used to render a current view. This request is typically generated by software executing on the client machine. Step 608 determines whether the requested file portion has been downloaded from the server. In the described embodiment, this step is accomplished by evaluating the validity tags of the Vfile. If a particular file portion that has been requested has a "valid" validity tag, then step 610 continues to process the request and render the current view. If, on the other hand, the requested file portion has an "invalid" validity tag, then step 612 generates an exception and sends a request to the server to download or stream the requested file portion to the client.

As the requested file portions are received they are individually stored in the Vfile. Depending on whether a particular file portion is useful in rendering a current view, it can be locked in the Vfile so that it cannot be removed. The locking mechanism is a temporary one so that when the image is released, all of the file portions are unlocked. When an additional requested file portion is received from the server, step 614 determines whether there is enough client memory, i.e. the Vfile, to hold the requested portion. Recall that because of client memory constraints it may be impracticable to store the entire contents of the server's file structure at the client end. If step 614 determines that there is enough client memory to store the additional file portion, then step 616 stores the file portion in the Vfile and continues the rendering operation. If, on the other hand, it appears there is not enough client memory to store the additional file portion, step 618 removes unlocked file portions of the Vfile and stores the additional structured media content file portions in the Vfile. One way for implementing step 618 is to evaluate the importance tags and/or hit count tags (i.e. the importance and access parameters respectively) to find the file portion or media unit with the smallest value or definable threshold of, for example, (importance+hit count) and to remove those portions. Exemplary pseudo code that implements this function is as follows:

```
Unit_update( )
{
    while (memory is not enough to hold the new media unit
received from the server)
    {
```

```
        find the media unit which is unlocked and has the smallest
value of (importance + hit count);
            remove media unit from Vfile;
        store the new media unit in Vfile
```

In one exemplary implementation, a client application, i.e. browser, implements software code that renders the current view over and over again using the file portions that are present in the Vfile. A user may interact at any time with the browser to change the region of interest and viewing resolution (for a JPEG 2000 browser), or to change the viewing position, angle, and FOV (for an IBR browser). In any instance, the browser renders the view based upon the content available in the Vfile. An important feature of the invention is that information that is not present in the Vfile, but which is necessary for the currently rendered view, is supplemented while the view is being rendered. Supplementation takes place by calling the server so that the additional file portions can be downloaded to the client and stored in the Vfile. Supplementing the Vfile can take place in any suitable manner. As an example, techniques used in error concealment can be used to supplement information that is not present in the Vfile. Exemplary techniques are described in a document authored by Wenjun Zeng and Bede Liu entitled "Rate Shaping by Block Dropping for Transmission of MPEG-Precoded Video over Channels of Dynamic Bandwidth", *ACM Multimedia* 1996: pps. 385-393. One exemplary approach to implementing this functionality is described in the pseudo code set forth immediately below. Of course, this represents but one exemplary approach and is not intended to limit the invention in any way.

```
Create_Vfile( );
Obtain_global_header( );
for (;;)
{
    update_view_point( )  //For JPEG 2000, it is the resolution
and position of the viewing window. For IBR, it is the updated
viewing position, angle, and camera FOV.//
        if (new_view)
            stop Vfile update;
        clear all temporary locks; clear decode list;
        for (i=1; i<L;i++)
            if (structure $s_i$ is useful in rendering current view)
            {
                temporarily lock structure $s_i$;
                if (query_Vfile: is structure $s_i$ valid?)
                    for (j=1; j<n; j++)
                        if (media unit $b_j$ is useful in rendering
current view)
                            if (query_Vfile: is media unit $b_j$ valid?)
                                temporarily lock unit $b_j$; add $b_j$ to the
decode list;
        update Vfile;
        decode all media units within the decode list, release
temporary lock during decoding;
            render current view;
}
```

In the example, the center of a Vfile-enabled media browser is a loop which renders the current view over and over again. Cache misses that are generated by the loop indicate that certain portions of a structured media content file are needed for rendering. Accordingly, when this happens, software code executing on the client knows that it must send a request to the server to obtain the missing file portions. The Vfile enhances the browsing experience because information that is streamed to the client over the network is reused.

As an exemplary implementation using the media units and sub media units of FIG. 4, consider the following: When an application call is made to access a particular media segment, the call is broken down into access calls of multiple SMUs which cover the entire media segment. The validity of the SMU is first checked, and a continuous header portion of available SMUs are returned to the calling application. For unavailable SMUs, a pending network request is generated to stream the SMU from the server. SMUs are stored within the cache space of its corresponding MU, which is allocated from the system memory. Any time an SMU is accessed, the hit count of the associated MU is increased by one. Whenever the hit count of a MU reaches the maximum value, it is halved together with the hit counts of all the MUs. The priority and importance of the calling media segments is applied to all of the MUs and SMUs affected. If a MU or a SMU is accessed multiple times, its priority and importance are determined by the function call with the highest priority and importance value. The priority and importance of the MUs and SMUs may be temporarily raised through a lock operation, and released through an unlock operation. Such lock and unlock operation may be used when a user shifts the region of interest (ROI) and to prevent the MUs needed in the current region to be swapped out of cache.

Exemplary Architecture for Managing Structured Media Content

Figure 7:
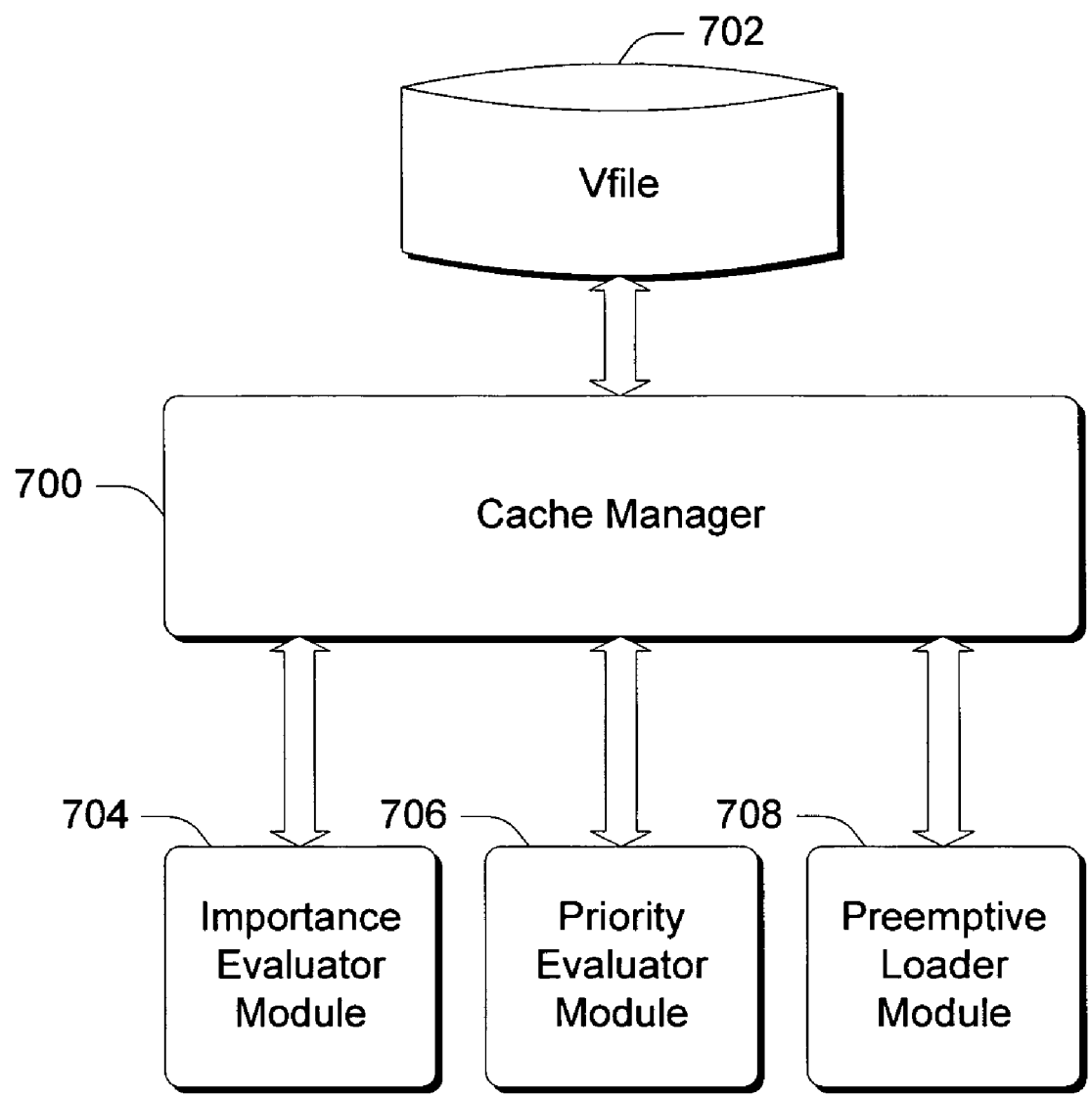
FIG. 7 is a diagram of a portion of an exemplary architecture that can be utilized in accordance with the described embodiment.

FIG. 7 shows a portion of an exemplary architecture that can be used to manage and oversee random access to structured media content files. The illustrated architecture can be implemented in any suitable hardware, software, firmware, or combination thereof.

To get the best browsing experience, all media content should not be treated equally. For example, in JPEG 2000 browsing, low resolution coefficients should be transmitted from the server before high resolution image content. The low resolution file portions should also be maintained in the Vfile as long as possible because they are useful in generating a broader viewing region.

In the described embodiment, a cache manager 700 is provided and manages the content of the Vfile. The cache manager ensures that the most pertinent portions of a structured media content file are maintained in the Vfile. Those portions that are not important or likely to be used by a client are removed from the Vfile to make room for other portions that are important or likely to be used. A plurality of modules are provided, in this example, that assist the cache manager in performing its job. In the illustrated and described embodiment, the following modules are provided: an importance evaluator module 704, a priority evaluator module 706, and a preemptive loader module 708.

Importance Evaluator Module

One role of importance evaluator module 704 is to assign importance values to a plurality of portions of the structured media content file. These importance values are used by the cache manager 700 to determine whether or not to remove individual portions of the structured media content file when, for example, additional portions of a file are streamed from the server to the client. The importance evaluator module can be implemented at the server or the client end. Although, for reductions in the server processing overhead, it is more advantageous to implement the importance evaluator module at the client end.

The implementation of the importance evaluator is media specific. That is, as each of the media with which the described embodiment can be utilized varies, so too can the factors that are considered when assigning importance values. An exemplary rule of thumb in determining the importance of file portions was given above, e.g. lower resolution file portions are more important than higher resolution file portions for JPEG 2000 image data. The importance values that are assigned by the importance evaluator module may be implemented at the time the media is encoded and stored with the media bit stream. Alternately, the server or client may calculate the importance values based upon factors such as resolution and quality level of the file portion or media unit.

Figure 8:
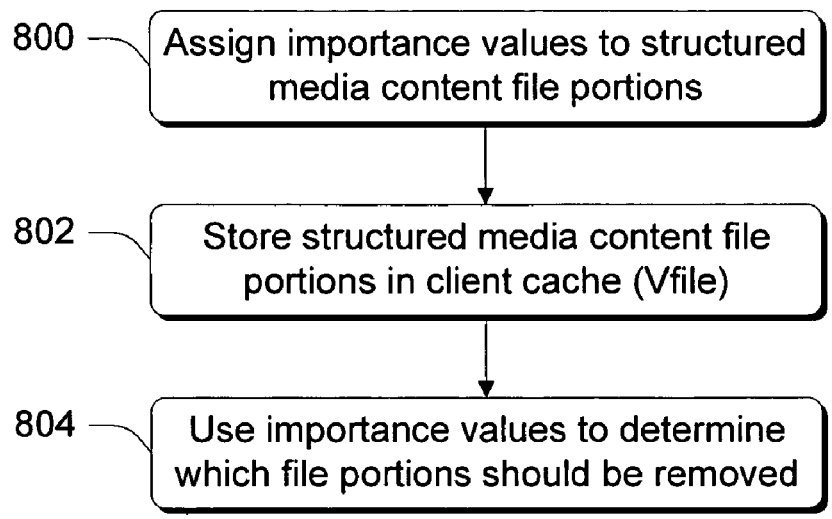
FIG. 8 is a flow diagram that describes steps in a method in accordance with the described embodiment.

FIG. 8 shows a flow diagram that describes steps in a method in accordance with the described embodiment. In the present example, these steps are implemented by both the importance evaluator module 704 and the cache manager 700. Step 800 assigns individual importance values to a plurality of structured media content file portions. Step 802 stores the structured media content file portions in a client cache structure, i.e. the Vfile. Step 804 uses the individual importance values to determine which stored structured media content file portions in the client cache should be removed to accommodate additional portions of the structured media content file that are obtained from the server. In the described embodiment, these steps can be performed while randomly accessing structured media content file portions located on a plurality of different computers such as the client and server computers discussed above.

Priority Evaluator Module

One role of the priority evaluator module 706 is to assign priority values to a plurality of structured media content file portions. The priority values are used to determine an order in which the portions are to be provided or streamed from one or more servers to a client. The priority evaluator module 706 can be implemented at the server or the client end. Although, for reductions in the server processing overhead, it is more advantageous to implement the importance evaluator module at the client end. The priority values are calculated and assigned to the individual file portions in much the same way as the importance values. That is, more important file portions (such as low resolution portions) should be streamed earlier than higher resolution file portions. One goal of the priority evaluator module is to have the most important and necessary file portions sent to the client first so that the browsing experience can be enhanced. This way, image data is rendered more quickly and efficiently for the user. For example, by having the lower resolution file portions sent first and used in the rendering process, a user can, for example, view a less detailed image while the higher resolution file portions are streamed from the server.

Figure 9:
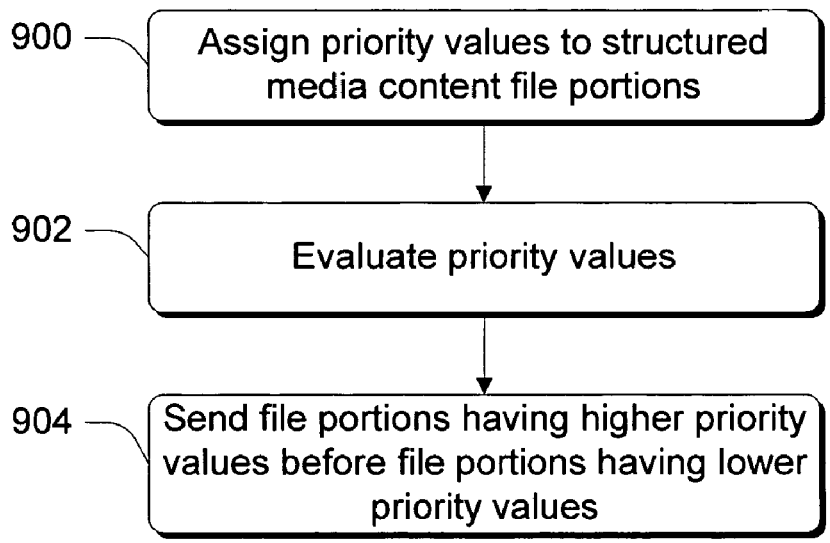
FIG. 9 is a flow diagram that describes steps in a method in accordance with the described embodiment.

FIG. 9 shows a flow diagram that describes steps in a method in accordance with the described embodiment. These steps can be implemented by the priority evaluator module 706 and/or one or more server computers. Step 900 assigns individual priority values to a plurality of structured media content file portions. The assignment of priority values, like the importance values, is media specific. In some instances, priority values are assigned based upon the resolution and/or quality of the structured media content file portions. In other instances other considerations are taken into account. For example, an exemplary alternative approach can be based on visual progressive coding, i.e. assignment of priority values based on a combination of SNR (signal-to-noise ratio) layer and visual weight as described in an article authored by J. Li entitled "Visual progressive coding", *SPIE Visual Communication and Image Processing (VCIP '99)*, Vol. 3653, pp. 1143-1154, San Jose, Calif., January 1999. Step 902 evaluates the individual priority values. In the described embodiment, one or more servers that are responsible for streaming media content to one or more clients evaluate the priority values to ascertain an order in which to stream requested media content. Responsive to the evaluation, step 904 sends at least one structured media content file portion having a higher priority value to a client before sending at least one structured media content file portion having a lower priority value. Thus, the priority evaluator module facilitates provision of random access to structured media content file portions.

Preemptive Loader Module

One role of the preemptive loader module is to predict what is the most likely media content file portion that a user is going to require or want, based upon one or more factors including the currently provided media content that the user has accessed. Accordingly, by predicting the likely needed file portions, the server can preemptively provide (or be preemptively requested to provide) the file portions to the client, without the client specifically requesting so when the portions are actually needed. Many factors can be considered in determining which file portions to preemptively provide to the client. For example, file portions that correspond to the "neighborhood" of the currently rendered view, i.e. close in proximity, as well as file portions that correspond to higher resolution content of the currently rendered view can be preemptively loaded. One assumption concerning these file portions is that users most probably will pan around their current view, or zoom into the current view. Thus, by anticipating where a user might navigate, file portions can be preemptively loaded to reduce the access time in the event they are needed. This further enhances the user's browsing experience.

Figure 10:
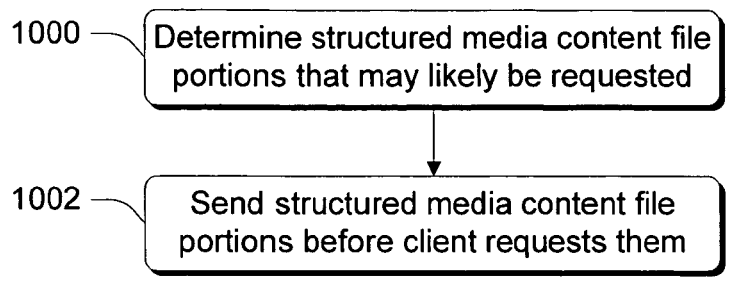
FIG. 10 is a flow diagram that describes steps in a method in accordance with the described embodiment.

FIG. 10 shows a flow diagram that describes steps in a method in accordance with the described embodiment. Step 1000 determines one or more structured media content file portions that may likely be requested by a client, but which have not specifically been requested by a client. As indicated above, this step can be implemented by ascertaining a current client view and either identifying file portions that are close in proximity with the portions that correspond to the current view and/or identifying file portions that corresponds to a higher resolution of the current view. Of course, other factors can be considered as well. Step 1002 sends one or more structured media content file portions to the client. The file portions can be sent responsive to a client-side request for the preemptive subject matter, or responsive to a server determination that the particular preemptive subject matter should be sent.

By determining which file portions may likely be needed by a user for rendering on a client machine, those portions can be preemptively streamed from the server before they are actually specifically queried for use by the client. It is possible that the client may preemptively request the file portions from the server though. It should be understood, however, that this particular type of client request is not a request associated with a per se use of the file portion, but rather is a request that is associated with a likely (but not guaranteed) use of the file portion. This results in a quicker, more efficient browsing experience.

The functionality of the above-discussed modules can be implemented at the server side, the client side, or shared at both ends. However, since the server may store a large number and category of media, and since the server handles requests from tens to hundreds of client simultaneously, it is more advantageous to implement the modules on the client side.

Exemplary Network Architecture for Managing Structured Media Content

One aspect of the invention provides a layered software architecture that implements a system for randomly accessing structured media content files over a network, such as the Internet. In the described embodiment, the architecture includes an application program interface (i.e. Vfile API) between the media program (i.e. client API) and the network (i.e. network API). By using the Vfile API, the media programmer can access a remote media file as a "virtual local file", and is relieved from the chores of network programming. The Vfile API operates along principles that are similar to the standard file operation API (fopen, fread, etc.). The Vfile API maps the media file at the server side virtually to the client side. The virtual local copy "looks" exactly the same as the remote media file. It varies in that segments or portions of the local file may be not available.

Figure 11:
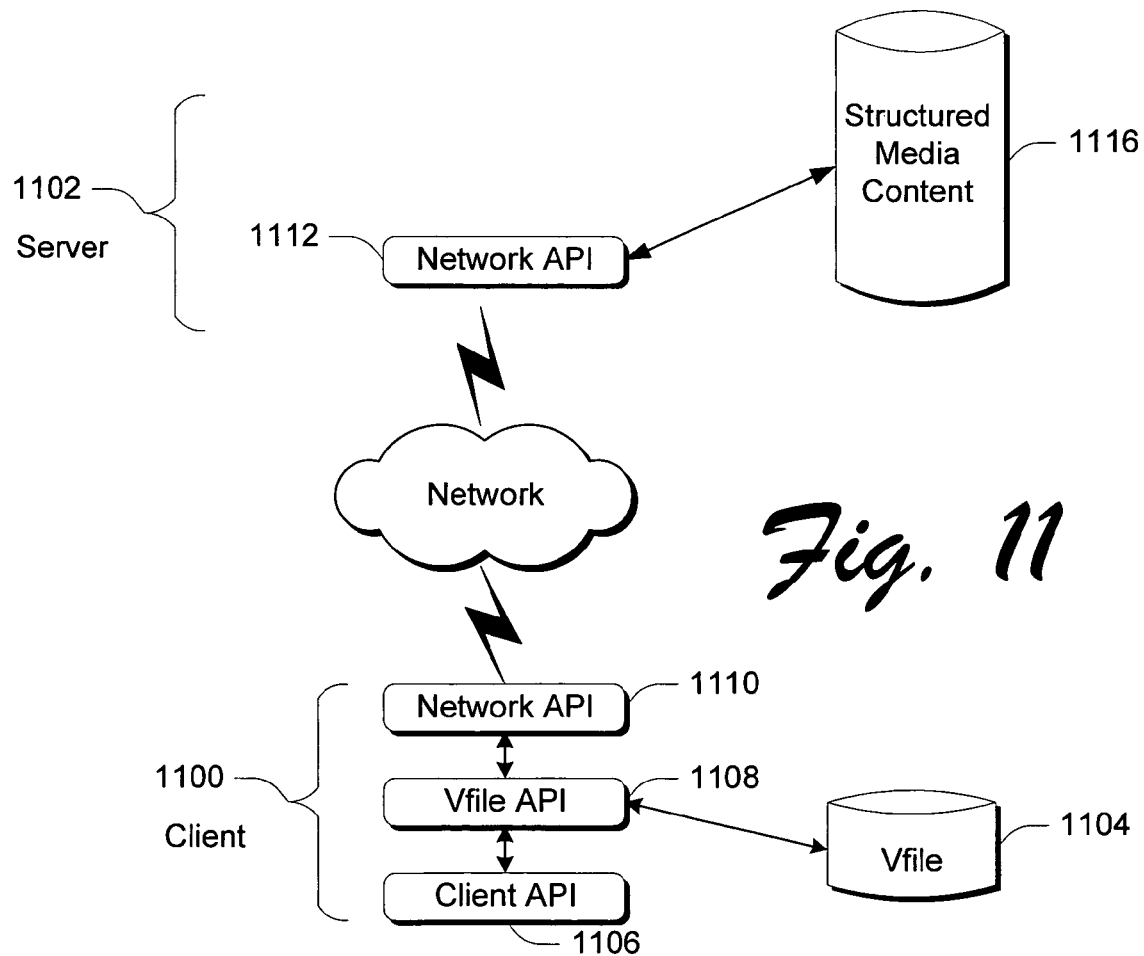
FIG. 11 is a diagram that illustrates an exemplary architecture that can be used in implementing the described embodiment.

FIG. 11 is a diagram that shows an exemplary multi-layered architecture in accordance with the described embodiment. The architecture on the client end is designated at 1100, and the architecture on the server end is designated at 1102.

Client architecture 1100 includes a Vfile 1104 and three layered sets of application program interfaces (APIs) that assist in managing and organizing both the client browsing experience and the Vfile 1104. An API is a set of routines (e.g. function or method calls) that an application program uses to request and carry out lower-level services performed by a computer's operating system. In the illustrated example, a client API 1106 is provided and interfaces with a user through, for example, the user's browser. The client API 1106 enables a user, through software executing on their computer, to request structured media content and have it rendered on their computer. In the described embodiment, the client API 1106 continuously monitors the Vfile 1104 and renders content based upon the contents of the Vfile. A Vfile API 1108 is provided and constitutes the middle layer in the client-side architecture. The client API 1106 depends on the Vfile API 1108 to get the content of the Vfile 1104. For example, the client API 1106 uses the Vfile API to perform file operations on the Vfile. For example, the client API 1106 opens and closes files in the Vfile through the Vfile API 1108. The client API 1106 also sends requests for needed portions of the Vfile to the Vfile API 1108. If the needed portions of the Vfile are not stored on the client side, the Vfile API generates a request that is used to gain access to the file portions from the server. The Vfile API 1108 also includes functions that can be used to lock and unlock file portions in the Vfile.

A network API 1110 is provided and supports the Vfile API 1108. The network API 1110 accepts requests for file portions from the Vfile API and sends them to a remote server. The network API 1110 also receives responses from the server, e.g. the requested file portions, and can then make function calls on the Vfile API to ensure that the requested file portions are copied into the Vfile 1104. In the described embodiment, the pending sub media unit (SMU) requests are sent to the network API 1110, which packages multiple requests into one or more large requests. The network API 1110 then sends the request to the media server and retrieves streamed media content from the server. The network API 1110 also handles packet loss and error resilience. In the described embodiment, a media list is built and maintained by the network API 1110. The media list records the SMU requests that are sent to the server. An identifier is attached to each SMU request so that the returning SMU can be easily identified. A timer is maintained for each SMU request that is sent. If a defined time frame is exceeded, the network API assumes that either the SMU request or the returned SMU packet has been lost in the transmission. The network API will again attempt to access the SMU packet. When the requested SMU packet arrives, it is stored in the Vfile cache 1104 and the corresponding request is removed from the media list.

In the described embodiment, the media request and the returned packet are transmitted with the same channel using the same TCP protocol, regardless of their priority level. Performance can be improved, however, by transmitting information through different channels. For example, the media request and high priority packets can be transmitted using TCP protocol; low priority packets can be transmitted using UDP protocol. The Vfile API may access the media file through a network other than the current Internet. In such a case, the only part of the API that needs modification is the network API 1110.

In the described embodiment, the server comprises a network API 1112 that communicates with the client-side network API 1110 for retrieving particular structured media content file portions from a content storage source 1116.

As an example of the work flow that occurs between a media application (client API) and the various APIs mentioned above, consider the following: The media application typically calls the Vfile API 1108 to access the remote media. Upon the receipt of the application's call, Vfile API 1108 checks to determine whether the remote media exists. If it exists, a virtual file identifier (vfid) is established, and the future Vfile API access uses the vfid, just like file operation calls uses a file identifier. Whenever a segment or portion of the remote media is accessed, Vfile API 1108 first checks to determine whether the segment or portion is in the Vfile cache 1104. If the entire segment is in Vfile cache 1104, the Vfile API 1108 assembles and returns the entire segment to the calling application. If none of the segment is in the Vfile cache 1104, the Vfile API 1108 returns immediately. If only a partial portion of the requested segment is in Vfile cache 1104, a continuous header portion of the segment is returned. In the latter two cases, a pending network request is also generated by the Vfile API 1108, which is later sent to the server so that the server can stream the missing segments or portions to the client. The pending request is processed by the network API 1110, which packages and prioritizes multiple requests, and handles network packet loss and errors. When a request packet arrives, it is stored in the Vfile local cache and waits to be accessed by the application program. The Vfile API 1108 may or may not report the arrival of the packet to the application. If the media application chooses to not be notified of the packet arrival, which is generally the common case, it may just access the Vfile 1104 over and over, and render the scene based on the available data.

Compared with handling the network connection all by itself, the above workflow of the media application is very simple. Through a group of unified Vfile APIs, the media programmer can disregard chores such as the network accessing protocol, cache management, error resilience and error correction, etc. The task of programming a browser supporting random media access becomes much simpler. The media browsing experience is also improved by the Vfile in three aspects: first, the streaming media content is cached locally and can be reused; second, the media content is prioritized and the most needed data is streamed first; third, the potentially needed media may be preemptively loaded. All these features and functionalities ensure that the user has a better rendered view as fast as possible within the available network bandwidth constraint.

Synchronous and Asynchronous Work Mode

In one aspect, the Vfile architecture can be configured to work in either a synchronous transmission mode or an asynchronous transmission mode.

The media application may call the Vfile API in a synchronous transmission mode. This means that the media segment must be available before the call continues. Most often though, the media application should work in the asynchronous transmission mode. In the asynchronous mode, when the media application calls the Vfile API to access a media segment, the Vfile API will return control immediately to the calling application, regardless of the outcome. The Vfile API attempts to fill the request on a "best effort" basis, i.e., if the entire accessed media segment is in the Vfile cache, it is returned to the calling application. If only part of the accessed media segment is in the Vfile cache, a continuous header portion is returned to the media application. If none of the accessed media segment is in the Vfile cache, nothing is returned to the calling media application. In this aspect, it is the responsibility of the calling media application to be aware that not all media segments are accessible immediately, and it should therefore have ways to handle the missing media segment. One possible strategy is for the media application to repeatedly render a scene using the data that is currently available. With this strategy, the user will, at first, get a coarsely rendered scene when some data is available. The scene will gradually improve as more and more data is received.

In a media file, there is usually a very important portion, i.e., the file head that contains scene size, coding method and parameters, etc, that must be streamed before other media access functional calls can be made. To speed up the media streaming experience, a companion file is built for each media file accessed. The companion file is maintained on the server. The companion file indicates the general structure of the media file. Initially, when a media application accesses a media file, the media content or file portions that are above a certain priority level are streamed to the media application. In addition, a preemptive download strategy may be adopted by the media application. Specifically, by accessing the media content surrounding the current view with a low priority, content that is most probably needed by the user may be streamed to the browser when the bandwidth is available.

Exemplary Application Program Interfaces for Implementing a Management System for Managing Structured Media Content The following APIs and data structure can be used to implement the described embodiment. It is to be understood that the following constitutes but one example of how APIs might be configured, and is not intended to limit the invention in any way. Accordingly, other arrangements of APIs can be used.

The description given below is best understood in the context of FIG. 11. The client API generates requests for needed portions of the Vfile, and forwards the requests on to the Vfile API 1108 for execution.

Vfile API

In the illustrated example, the Vfile API includes twelve file operation functions. The Vfile also includes a synchronous mode and an asynchronous mode. In the synchronous mode, the function waits until data has arrived from the server. Additionally, the Read function will return an indication of the Network status so that the client API can remain informed. In the asynchronous mode, the function will test to see whether there is data at the client end. If there is data, the function will fill the appropriate buffer provided by the calling application. If there is no data, the function will return immediately.

The following table gives a list of the twelve Vfile APIs, their parameters list, and return values:

| ID | APIs | Parameters List | Return Value |
|---|---|---|---|
| 1 | VFOpen | "URL", proc1*, [bRefresh = FALSE], [iPriority = 0] | vfid (−1 means error) |
| 2 | VFRead | vfid, RequestStruct*, NetworkStatus*=NULL | iLength |
| 3 | VFSeek | vfid, iOffset, iPosition | iOffset |
| 4 | VFSync | vfiid, bAsyncFlag = TRUE | iRequestNum |
| 5 | VFStat | vfid | struct* (return comp file) |
| 6 | VFClear | vfid, [importance] | void |
| 7 | VFLockCache | vfid, offset, size | bFlag |
| 8 | VFUnLockCache | vfid, offset, size | bFlag |
| 9 | VFTell | vfid | iCurrentPos |
| 10 | VFClose | vfid, bWriteCacheFlag = TRUE | bFlag |
| 11 | VFSetReportImportance | iReportId, importance | iImportance |
| 12 | VFCopyToCache | RequestStruct* | iLength |

The following is a more detailed explanation of the Vfile APIs listed in the above table:

(1) int VFOpen(char* pszUrl, void* pProc1, BOOL bRefresh, int iPriority);
RETURN VALUE :
vfile id for the vfile that is specified by parameter pszUrl;
PARAMETERS
pszUrl, the vfile that needs to be opened;
pProc1, a function pointer that is provided by the Media Layer (client API); the function will be called by the VFile API when a particular condition has been met.
bRefresh, Flag to indicate whether to use current local disk file cache
TRUE : doesn't use local disk file cache;
FALSE: use the vfile's local disk file cache that has been defined.
iPriority, PreLoad level. The media content may have different priority; iPriority indicates that the content whose priority level is higher than iPriority needs to be preloaded.
REMARK:
This function opens the vfile that is specified by pszUrl. If the bFrefresh parameter is FALSE, then load the disk cache of this file into memory (if it exists), and preload the data that has a priority that is higher than iPriority from the server side.

(2)int VFRead(int vfid,
RequestStruct* pRequestStr, NetworkStatus* pNetStatus) ;
RETURN VALUE
The byte size that VFRead obtains.
PARAMETERS
vfid : The vfile id;
pRequestStr: The VFRead request.
pNetStatus: The Network status that obtained from Network API.
REMARK:
This function accepts a request from the client API that indicates a particular block of data that the caller needs, checks the memory cache and the disk cache file to determine if the data is already at the client side. If a part of the data is valid and the request provides a buffer, then this function copies the valid data into the buffer, otherwise it does nothing. But at both times, it will return the data byte size that is valid. If a part of data is not valid, then the VFile API will send a request to the Network API to ask for the data from the server.

(3) int VFSeek(int vfid, int iOffset, int iPosition);
RETURN VALUE
The offset, in bytes, of the new position from the beginning of the file.
PARAMETERS
vfid : vfile id
iOffset: The offset to be sought.
iPosition: The start position in this seek operation
REMARK
The function moves the file pointer associated with the vfile to a new location that is offset bytes from start position. This function locates a portion of the file that is desired to be read.

(4) int VFSync(int vfid, BOOL bAsyncFlag) ;
RETURN VALUE
−1 if Fail , 0 if success.
PARAMETERS
vfid : vfile id
bAsyncFlag: mode flag.
If flag is TRUE then asynchronous requests need be flash out
Otherwise, synchronous requests should be flash out
REMARK
Whether in the VFile layer or in the Network layer, the requests that are to be sent may be buffered to improve efficiency. Accordingly, there may be some requests that are not sent out immediately. This function flashes out all the synchronous or asynchronous requests, which depend on the value of the parameter bAsyncFlag. If the bAsyncFlag parameter is FALSE, it indicates a synchronous read, so that the expected contents should be returned. Additionally, the function will wait until all of the content arrives before it returns. Otherwise, if the bAsyncFlag parameter is TRUE, only asynchronous requests are sent out, and the function will return immediately.

(5)FileStat*   VFStat(int vfid) ;
RETURN VALUE
File status that stores in FileStat record
PARAMETERS
vfid : vfile id
REMARK
This function gets the companion file that comes with the media file.

(6) int VFClear(int vfid, int iImportance) ;
RETURN VALUE
reserved
PARAMETERS
vfid : vfile id
iImportance: reserve importance.
REMARK
This function uses the Network API to inform the server to dismiss the content that has not been send to client side, unless the content has an importance that is higher than the parameter iImportance.

(7)int VFLockInCache(int vfid, int iOffset, int iSize) ;
RETURN VALUE
reserved.
PARAMETERS
vfid : vfile id
iOffset: start offset of data
iSize : size of data segment
REMARK
This function locks a data segment in the vfile starting from iOffset having length iSize.

(8)int VFUnLockInCache(int vfid, int iOffset, int iSize) ;
RETURN VALUE
reserved
PARAMETERS
vfid : vfile id
iOffset: start offset of data
iSize: size of data segment -continued

```
REMARK
    This function Unlocks the data segment that was locked with
VFLockInCache.
(9)int VFTell(int vfid) ;
RETURN VALUE
    Current vfile pointer position.
PARAMETERS
    vfid: vfile id
REMARK
    This function returns the current vfile pointer position.
(10)BOOL    VFClose(int vfid, BOOL bWriteCacheFlag) ;
RETURN VALUE
    FALSE for error, TRUE for success.
PARAMETERS
    vfid : vfile id
    bWriteCacheFlag: Flag that enables the memory cache to be
written into the disk cache file before closing the vfile.
REMARK
    This function closes the vfile. It also enables the memory
cache to be written to the disk cache so that browsing activities
on a certain file portion can be resumed after a browsing session
has been closed.
(11)int VFSetReportImportance(int vfid, int iImportance) ;
RETURN VALUE
    reserved
PARAMETERS
    vfid : vfile id
    iImportance: The importance of a particular file portion
that is used to determine if it is to be sent (streamed) before
other file portions.
REMARK
    This function is used by the Media Layer to specify certain
Importance/Priority levels. Based on the specified levels, if the
incoming data's Importance/Priority is above the level appointed
by this function, a message will be sent to the Media Layer to
inform it that new data has arrived. This function is used in
the Asynchronous model that is used by the Media Layer.
(12)int VFCopyToCache(RequestStruct* pRequestStr, BYTE*
pBuffer)
RETURN VALUE
    −1 for cache busy. Otherwise return copy data byte size
PARAMETER
    pRequestStr : Request pointer , to indicate what the data
is
    pBuffer: Buffer that holds the data.
REMARK
    A function pointer pointing to this function will be transferred
to the Network Layer when the NFOpen (an API of the Network Layer) is
called. This pointer will be used when data comes from the network.
This function tries to copy the corresponding data from the Network
Layer's buffer to the VFile's Cache. If coping data fails, it will
return −1, else return the copied size.
```

Network API

The network API supports the Vfile API, accepts requests from the Vfile API and sends the requests to the remote server. The network API also receives data from the remote server. The network API uses a function pointer to interact with the Vfile API. When data arrives at the network API from the server, the network API calls the function pointer which was previously provided by the Vfile API when the Vfile API called the NFOpen function on the network API. The function pointer is translated in as the "proc2" parameter, as described in more detail below. The network API will then copy the data received from the remote server into the Vfile cache.

The following table gives a list of nine network APIs, their parameters list, and return values:

| ID | Network APIs | Parameters List | Return Value |
|---|---|---|---|
| 1 | NConnect | "host name" | nid |
| 2 | NFOpen | nid, "filename", proc2*, int *len | nfid |
| 3 | NSyncRequest | nfid, RequestStruct* | void |
| 4 | NSync | nfid | bFlag |
| 5 | NASyncRequest | nfid, RequestStruct*, NetworkStatus*=NULL | void |
| 6 | NASync | nfid | bFlag |
| 7 | NFClear | nfid, iImportance/iPriority, | bFlag |
| 8 | NFClose | nfid | bFlag |
| 9 | NConnectClose | nid | bFlag |

The following is a more detailed explanation of the network APIs listed in the above table:

```
(1)  int NConnect(CString hostname);
RETURN VALUE
    id for connecting to the server
PARAMETER
    hostname : hostname of server
REMARK
    This function sets up a connection to a server, and returns
the connection id.
(2)  int NFOpen(int nid, char* filename, int
    (*vfproc) (RequestStruct*, BYTE*), long& len);
RETURN VALUE
    id for the file
PARAMETER
    nid : connect id
    filename : file name to be open
    vfproc: the Network Layer will call this function pointer
when asynchronous data is reached.
    len : the length of file
REMARK
    This function tries to open a file on a server that has a
connection with the client which has an id number that equals the nid
parameter. The function stores the vfproc function pointer for future
use, and returns the remote vfile length in len parameter.
(3)  void NSyncRequest(int nfid, RequestStruct* request);
RETURN VALUE
    TRUE for success, FALSE for fail.
PARAMETER
    nfid : file id
    request : data request to be sent
REMARK
    This function sends out the request to the network layer,
and waits until the data is received from server side.
(4) BOOL NSync (int nfid);
RETURN VALUE
    TRUE for success, FALSE for fail.
PARAMETER
    nfid : file id
REMARK
    Flashes out the buffered synchronous requests to the
server.
(5) BOOL
    NASyncRequest(int nfid, RequestStruct* request, NetworkStatus*
netstatus = NULL)
RETURN VALUE
    TRUE for success, FALSE for fail.
PARAMETER
    nfid : file id
    request: the data request that needs to be sent
    netstatus: the network layer status
REMARK
    This function sends out the request to the network layer,
and returns the network status in netstatus parameter. The function
returns immediately, i.e. it does not wait for the completion of the
network function call.
(6)BOOL NASync(int nfid);
RETURN VALUE
    TRUE for success, FALSE for fail.
```

-continued

```
PARAMETER
    nfid : file id
REMARK
    Flashes out the buffered asynchronous requests to server.
(7)BOOL NFClear(int nfid, BYTE priority);
RETURN VALUE
    TRUE for success, FALSE for fail.
PARAMETERS
    nfid : file Id
    priority: the priority level.
REMARK
    This function is the lower API of the VFClear from the
Vfile APIs above. This function informs the server and clears the
unsent data for the file which is specified by nfid, unless the
priority of that data is higher than the priority level that is given
as a parameter.
(8)BOOL NFClose(int nfid);
RETURN VALUE
    TRUE for success, FALSE for fail
PARAMETERS
    nfid: file id on a connect
REMARK:
    This function closes the file that is specified by nfid.
(9)BOOL NConnectClose(int nid);
RETURN VALUE
    TRUE for success, FALSE for fail
PARAMETERS
    nid : connect id
REMARK
    This function disconnects the connection that is specified
by nid.
```

The following data structures can be used in connection with the above described APIs:

```
typedef struct_RequestStruct
{
  BYTE* pBuff ; // if pBuff is NULL, VFRead will only send
  request out and return,
            //buffer is used to hold data, if data is cache
    int         iOffset ; // start offset of data
    int         iSize ;   //data segment length
    BYTE    iPriority ; //priority of data
    BYTE    iImportance ; //importance of data
    int         vfid ; //vfid of this request
    BOOL bAsyncFlag ; // default is TRUE, which means async
model.
} RequestStruct;
typedef struct _NetworkStatusStruct
{
    int             requestLen;   //total number of uncompleted
requests in the network layer
    int             requestSize;    //total request data size of
uncompleted requests in network layer
} NetworkStatus;
typedef struct _tagFileStat {
    int         vfid ;
    long        iFileSize ;
    BYTE*   pBuffer ;
} FileStat ;
    This data structure should be defined by the VFile Layer, which
is used to store the companion file's information. It should be filled
in when the function VFOpen(..) is called and can be accessed by the
function VFStat(..) :
```

The above APIs and data structures constitute but one example implementation of the described embodiment. Accordingly, the described APIs and data structures are not intended to limit the invention in any way.

Example Using JPEG 2000 File Structure

Figure 12:
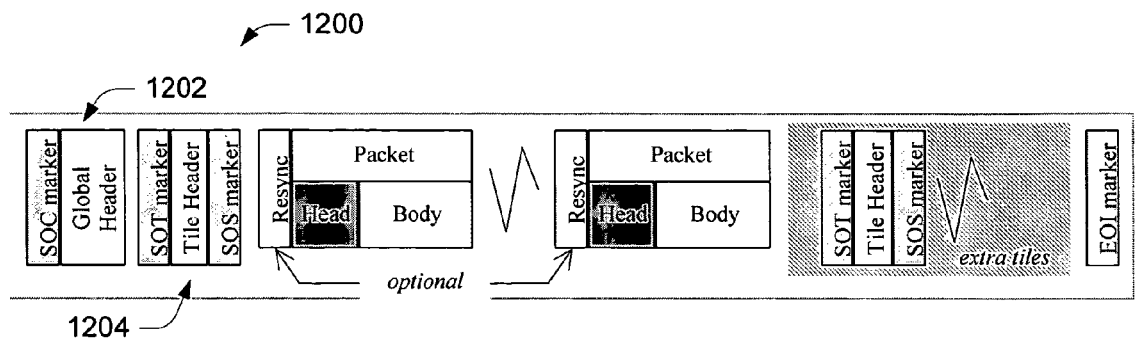
FIG. 12 is a diagram of an exemplary JPEG 2000 file structure.
Figure 13:
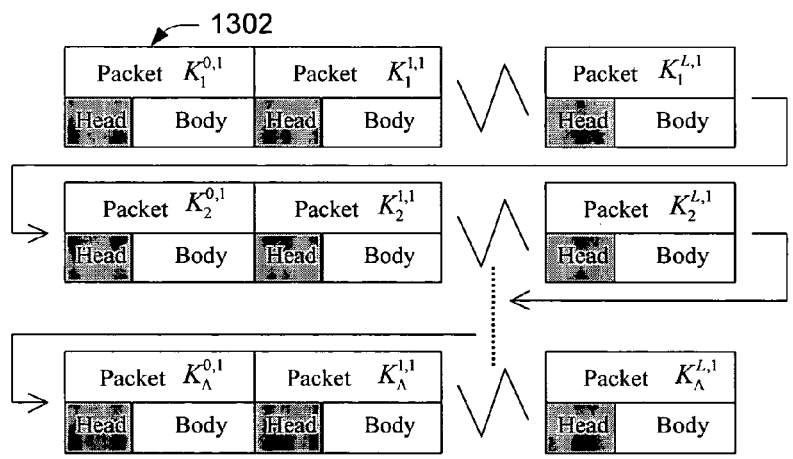
FIG. 13 is a diagram of an exemplary multiple layer "SNR" (signal-to-noise ratio) progressive bit stream organization.

JPEG 2000 constitutes but one example of a structured media content file. An exemplary JPEG 2000 bit stream is shown in FIG. 12 at 1200. The bit stream is led by a global head 1202 that contains crucial information for the decoding operation, e.g. the image and tile size, the transform and coding method, the color component and the bit depth of the image. In JPEG 2000 coding, a large image is segmented into tiles, e.g. tile 1204, where each tile is processed and encoded independently. The compressed bit stream of a tile is packaged independently with a tile head. A tile is further transformed and quantized into a number of sub bands:

$$I \rightarrow S_1, S_2, \ldots, S_n,$$

where I is a tile, $S_i$ is a sub band of a certain resolution and color component. Each sub band is then segmented into fixed size blocks, $$S_i \rightarrow K_{i,1}, K_{i,2}, \ldots K_{i,m},$$

where $K_{i,j}$ is a block of sub band $S_i$. Each block is encoded independently into a block bit stream, which may be further divided into bit stream segments:

$$K_{i,j} \rightarrow B_{i,j,1}, B_{i,j,2}, \ldots, B_{i,j,L};$$

where $B_{i,j,l}$ is a compressed bit stream segment of block $K_{i,j}$. The bit stream is segmented in such a way that all bit stream segments $B_{i,j,l}$ in the SNR layer l contribute to about the same distortion decrease per bit spent, i.e., they are on the same rate-distortion (R-D) slope. The bit stream segment $B_{i,j,l}$ may be accessed independently, and is the basic access unit of JPEG 2000. We assume that the JPEG 2000 bit stream is assembled in SNR progressive mode, as shown in FIG. 13.

The bit stream segments of the same SNR layer l and of all blocks with the same resolution level and component are packaged together to form a packet, e.g. packet 1302. A header is attached to each packet which provides an index to the bit stream segments within the packet, e.g. how many bytes are there in bit stream segment $B_{i,j,l}$. The JPEG 2000 bit stream is organized such that the file head is followed by the bit stream of tile 1, then the bit stream of tile 2, and so on. Within each tile, the bit stream of SNR layer 1 comes first, then the bit stream of SNR layer 2, etc. Within each SNR layer, the bit stream is organized from the coarsest resolution level to the finest resolution level.

There are two components in the JPEG 2000 compressed bit stream: the bit stream segments $B_{i,j,l}$ that can be accessed independently, and the media structure that includes the file head, tile head, and the packet head. The media structure must be available before the individual bit stream segments can be accessed. A companion file is thus built to identify the location of the media structure, and is stored at the media server. The companion file can be eliminated if the design of the JPEG 2000 file format were to include such index in the file head.

In the described example, a JPEG 2000 plug-in is implemented with the Vfile API. The plug-in wraps around a JPEG 2000 VM 5.2 decoder and provides Internet browsing functionality for a user-selected region and resolution. When the JPEG 2000 plug-in is launched, it contacts the Vfile API and establishes a connection with the media server where the JPEG 2000 bit stream is stored. Upon connection, the media structure is streamed in a synchronous mode to the Vfile API with the assistance of the companion file. In the described example, the file head, the tile heads and the packet heads are all streamed at the connection stage in the synchronous mode, which accounts for around 1% of the compressed bit stream. However, it is possible to pre-stream only the file head, the tile heads and a few low SNR layer packet heads. The rest of the high SNR layer packet heads can be loaded only when its media content is accessed. Such strategy is useful to reduce the connection time when a huge image is accessed.

The exemplary JPEG 2000 plug-in allows a user to selectively browse a specific area of the image with a certain resolution. For simplicity, we call the accessed area with the specific resolution the "current region". The user may zoom and pan around to a new region. To decode the current region, all wavelet coefficient blocks above the current resolution within an area slightly larger than the current area (due to the extension of the wavelet filter) have to be decoded. Such wavelet coefficient blocks are said to "cover" the current region. The plug-in accesses all the needed coefficient blocks and their bit stream segments, but with different priorities and importance.

Since the priority determines the streaming order, the priority assignment is determined by the SNR layer and the resolution level of the bit stream segment, and is disregarded relative to the component and the location of the coefficient block. The lower SNR layer is assigned a higher priority than the higher SNR layer. Within the same SNR layer, the coarser resolution level is assigned a higher priority than the finer resolution level. The bit stream of the current region is thus streamed with an SNR progressive order. The visual quality of the streaming is further improved by selecting a visual progressive order that determines the priority of the bit stream segment by a combination of the SNR layer and the visual weight of the sub band.

The importance assignment correlates with the cache management strategy. In this example, the importance of the bit stream segment is only tied to its resolution level, and is irrelevant of the component and SNR layer. The bit stream segment of a coarse resolution level is assigned with a higher importance and thus will not be swapped out of the Vfile cache as often as the finer resolution coefficients. The JPEG 2000 plug-in also places a temporary lock on the bit stream segments of the current region and raises their importance to ensure that they will not be swapped out of the Vfile cache.

To decode a view of the current region with the available data, the JPEG 2000 plug-in first assembles the bit stream segments $B_{i,j,l}$, l=1, ..., L of each coefficient block covering the current region. If a bit stream segment $B_{i,j,l}$ is not available or is only partially available from the Vfile cache, all bit stream segments afterward for that block will be discarded. The available bit stream segments $B_{i,j,1}$, $B_{i,j,2}$, ... $B_{i,j,l}$ are assembled together and form the current available bit stream of the coefficient block which is then progressively decoded by the JPEG 2000 VM 5.2. If the available bit stream of the coefficient block is empty, the coefficient block is decoded as all zeros. After all coefficient blocks covering the current region are decoded, the coefficients are inverse quantized and inverse wavelet transformed. The JPEG 2000 plug-in decodes and updates the current region at a regular interval. With more and more bit stream segments arriving, the image quality of the current region becomes progressively better. In essence, the JPEG 2000 plug-in accesses only the bit stream segments that are necessary to decode the current view in a SNR progressive fashion. This provides a very good browsing experience for the user.

Whenever the user moves the current region by panning around and/or zooming, the JPEG 2000 plug-in first clears the media list and informs the server to abandon any unfulfilled SMU requests (through a VFClear call). The rational behind this is that, in the case where the current region changes, it is essential to immediately deliver the bit stream segments of the updated region. The previous SMU requests that are still pending in the Vfile client and server queue hinder the immediate delivery of the new bit stream segments, and thus should be removed from the queue. The importance values of the MUs covered in the previous region are restored with an unlock call to the Vfile API. The bit stream segments of the updated region are then accessed by the JPEG 2000 plug-in in a similar mode described above. Some of the file portions corresponding to the updated region are immediately available in the Vfile cache, e.g., the bit stream segments of the coarse resolution level blocks that cover a very large area. Their associated coefficient blocks are decoded or partially decoded based on the available bits. Some of the bit stream segments may not be available, and their associated coefficient blocks will be first decoded as all zeroes. The unavailable bit stream segments of the updated region are again streamed in a SNR progressive mode. The JPEG 2000 plug-in still provides the "best" browsing experience with the available downloaded bit stream.

CONCLUSION

The described methods and systems greatly facilitate random access to structured media content file portions. Aspects of the invention provide a novel cache structure that is useable to manage structured media content that is provided from one or more servers. Browsing is enhanced because the rendering operation is performed over currently available content, while needed content is contemporaneously acquired over a network. The novel cache structure and disclosed management techniques ensure that content that is needed or likely to be needed to render a particular view is maintained on the client side during rendering operations. File portions are prioritized so that the most important file portions are first provided by the server, followed by lesser important file portions. In addition, important file portions are assigned importance values so that they are not inadvertently removed from the novel cache structure during cache management of the randomly accessed file portions. Further, media content that is likely to be needed by a client can be preemptively loaded at the client end (as through a preemptive request sent by the client to the server) so that regions that are most likely to be next viewed or visited by a user are streamed to the client in advance.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for randomly accessing structured media content comprising:
   assigning individual importance values to a plurality of portions of a structured media content file, wherein said assigning takes place when the portions of the structured media content file are encoded and said assigning is at least partially based on a type of the structured media content file;
   storing the plurality of portions of the structured media content file in a client cache structure;
   using the individual importance values, while randomly accessing other portions of the structured media content file located on a plurality of different computers, to determine which stored portions of the structured media content file in the client cache should be removed.

2. The method of claim 1, wherein said assigning takes place based upon the resolution of the portions of the structured media content file.

3. The method of claim 1, wherein said assigning takes place based upon the quality of the portions of the structured media content file.

4. One or more computer-readable media having computer-readable instructions thereon which, when executed by a computer, implement the method of claim 1.

5. A method for randomly accessing structured media content comprising:
   assigning individual priority values to a plurality of portions of a structured media content file, wherein said assigning comprises assigning priority values based upon the resolution of the portions of the structured media content file;
   evaluating the individual priority values;
   predicting a structured media content file portion that a client will most probably request so that the structured media content file portion can be preemptively provided to the client, without the client requesting so, wherein the predicting said portions occurs by determining which portions correspond to increased resolution content of a currently rendered view;
   responsive to said evaluating, sending at least one portion of the structured media content file having a higher priority value to a client before sending at least one other portion of the structured media content file having a lower priority value to provide random access to a plurality of portions of the structured media content file; and
   responsive to said predicting, sending at least one portion of the structured media content file having a higher probability of being requested to a client before at least one other portion of the structured media content file having a lower probability of being requested.

6. The method of claim 5, wherein said assigning comprises assigning priority values based upon the quality of the portions of the structured media content file.

7. The method of claim 5, wherein said sending comprises streaming said at least one portion of the structured media content file to the client.

8. One or more computer-readable media having computer-readable instructions thereon which, when executed by a computer, implement the method of claim 5.

9. A method for randomly accessing structured media content comprising:
   determining one or more portions of a structured media content file that have a highest probability of being requested by a client, but which have not been requested by the client;
   predicting a structured media content file portion that a client will most probably request so that the structured media content file portion can be preemptively provided to the client, without the client requesting so, wherein the predicting said portions occurs by determining which portions correspond to increased resolution content of a currently rendered view; and
   responsive to said predicting, sending at least one portion of the structured media content file having a higher probability of being requested to a client before at least one other portion of the structured media content file having a lower probability of being requested.

10. The method of claim 9, wherein said determining comprises:
    ascertaining a current client view; and
    identifying one or more portions of the structured media content file that are close in proximity with other portions of the structured media content file that correspond to the current client view.

11. The method of claim 9, wherein said determining comprises:
    ascertaining a current client view; and
    identifying one or more portions of the structured media content file that correspond to an increased resolution of the current client view.

12. One or more computer-readable media having computer-readable instructions thereon which, when executed by a computer, implement the method of claim 9.

13. A computer-readable medium having computer-executable instructions for managing structured media content embodied thereon, the computer-executable nstructions, when executed, configuring a computer system to perform actions comprising:
    assigning importance values via an importance evaluator module configured to assign the importance values to a plurality of portions of a structured media content file, the importance values being useable to determine whether to remove individual portions of the structured media content file from a client cache file;
    assigning priority values via a priority evaluator module configured to assign priority values to a plurality of portions of a structured media content file, the priority values being useable to determine an order in which the portions are to be provided from a server to a client; and
    predicting a structured media content file portion via a preemptive loader module configured to predict the structured media content file portion that a client will most probably request so that the structured media content file portion can be preemptively provided to the client, without the client requesting so, wherein the preemptive loader module predicts said portions by determining which portions correspond to increased resolution content of a currently rendered view.

14. The computer-readable medium of claim 13 wherein each assigned importance value is an assigned individual importance value.

15. The computer-readable medium of claim 13, wherein the preemptive loader module predicts said portions by determining which portions are close in proximity to portions that correspond to a currently rendered view.

16. The computer-readable medium of claim 13 wherein each assigned priority value is an assigned individual priority value.

17. The computer-readable medium of claim 13 implemented on one or more client computers that are configured to display images that correspond to the structured media content.

18. The computer-readable medium of claim 13, at least portions of which are implemented on one or more client computers that are configured to display images that correspond to the structured media content, other portions of which are implemented on one or more server computers that are configured to access and provide structured media content to the one or more client computers.

19. The computer-readable medium of claim 13 implemented on one or more client computers, wherein each client computer includes a client application program interface (API), a Vfile API, and a network API, wherein a Vfile is established at a client and configured to emulate a server file structure to store structured media content.

20. The computer-readable medium of claim 13, further comprising a Vfile, wherein the Vfile is established at a client, configured to emulate a server file structure to store structured media content, and utilizes one or more media management tags associated with the Vfile and configured for use in cache management of portions of the structured media content file that are randomly accessible by a client, wherein the media management tags comprise:
  a validity tag that indicates whether a particular portion of a structured media content file has been downloaded from the server;
  an importance tag that indicates the importance of a particular portion of a structured media content file, the importance tag being configured for use in determining whether or not to lock the particular portion of the structured media content file in the client file structure; and
  a hit count tag that gives an indication of how many times a particular portion of a structured media content file cached in the client file structure has been accessed.

* * * * *

UNITED STATES PATENT AND TRADEMARK OFFICE
CERTIFICATE OF CORRECTION

| | | |
|---|---|---|
| PATENT NO. | : 7,490,104 B2 | |
| APPLICATION NO. | : 10/843544 | |
| DATED | : February 10, 2009 | |
| INVENTOR(S) | : Jin Li et al. | |

It is certified that error appears in the above-identified patent and that said Letters Patent is hereby corrected as shown below:

In Face page, in field (75), under "Inventors" column 1, line 3, delete "Xianoning" and insert -- Xiaoning --, therefor.

In column 2, line 44, after "relevant" insert -- media data is collected or re-collected from the server. Other viewers, such as a --.

In column 28, line 12, in Claim 13, delete "nstructions," and insert -- instructions, --, therefor.

Signed and Sealed this
Third Day of May, 2011

David J. Kappos
*Director of the United States Patent and Trademark Office*